(12) United States Patent
Hackel et al.

(10) Patent No.: US 10,878,356 B2
(45) Date of Patent: Dec. 29, 2020

(54) AUTOMATIC ANALYSIS OF MATERIAL-RELATED EXPOSURE AND/OR EXPOSURE STRATEGY PRIORITIZATION

(71) Applicant: Sartorius Stedim Biotech GmbH, Göttingen (DE)

(72) Inventors: Heiko Hackel, Heidenheim (DE); Dean Adams, Obernjesa (DE)

(73) Assignee: Sartorius Stedim Biotech GmbH, Gottingen (DE)

( * ) Notice: Subject to any disclaimer, the term of this patent is extended or adjusted under 35 U.S.C. 154(b) by 301 days.

(21) Appl. No.: 15/697,213

(22) Filed: Sep. 6, 2017

(65) Prior Publication Data
US 2019/0073614 A1    Mar. 7, 2019

(51) Int. Cl.
*G06Q 10/06* (2012.01)
*G06Q 10/08* (2012.01)

(52) U.S. Cl.
CPC ... *G06Q 10/0635* (2013.01); *G06Q 10/06314* (2013.01); *G06Q 10/0833* (2013.01); *G06Q 10/0838* (2013.01); *G06Q 10/0875* (2013.01)

(58) Field of Classification Search
CPC .................................................. G06Q 10/06
See application file for complete search history.

(56) References Cited

U.S. PATENT DOCUMENTS

| | | | | |
|---|---|---|---|---|
| 2007/0033095 A1* | 2/2007 | Hodgin | ............... | G06Q 10/063 705/7.28 |
| 2015/0100533 A1* | 4/2015 | Daulton | ............... | G06Q 10/10 706/46 |
| 2017/0331835 A1* | 11/2017 | Yu | ........................ | H04L 63/105 |
| 2018/0300793 A1* | 10/2018 | Chen | ..................... | G06N 5/048 |

OTHER PUBLICATIONS

EPM, "The Kraljic Matrix: How to Optimize Purchasing Costs and Risks," http://www.expertprogrammanagement.com/2011/08/the-kraljic-matrix/, Aug. 24, 2011, 6 pages.
Hesping et al., "Matching tactical sourcing levers with the Kraljic matrix: Empirical evidence on purchasing portfolios," International Journal Production Economics 177 (2016) 101-117, Apr. 19, 2016, 18 pages.

* cited by examiner

*Primary Examiner* — Kurtis Gills
(74) *Attorney, Agent, or Firm* — Harrity & Harrity, LLP

(57) ABSTRACT

A device may receive data related to a material. The data may permit an analysis of an exposure related to the material. The data may be received from another device. The device may process the data to determine a category of materials for the material. The category of materials may indicate a set of exposures, related to the material, to an organization. The device may process the data to determine an exposure preparedness level associated with the material. The exposure preparedness level may indicate a preparedness of the organization to handle the set of exposures related to the material. The device may determine a score for the material based on the category of materials and the exposure preparedness level associated with the material. The score may indicate the exposure related to the material. The device may perform an action related to the material based on the score for the material.

20 Claims, 10 Drawing Sheets

AUTOMATIC ANALYSIS OF MATERIAL-RELATED EXPOSURE AND/OR EXPOSURE STRATEGY PRIORITIZATION

BACKGROUND

An item (e.g., an item of manufacture, a product, and/or the like) may be composed of various materials. An organization providing the item to a customer may receive the various materials from various suppliers, may produce the various materials internally, and/or the like. The various materials may need to satisfy various guarantees to customers and/or from suppliers, various regulations regarding quality and/or handling of the various materials, and/or the like.

SUMMARY

According to some possible implementations, a device may include one or more processors to receive data related to a material. The data may permit an analysis of an exposure related to the material. The data may be received from one or more other devices. The one or more processors may process the data to determine a category of materials for the material. The category of materials may indicate a set of exposures, related to the material, to an organization. The one or more processors may process the data to determine an exposure preparedness level associated with the material. The exposure preparedness level may indicate a preparedness of the organization to handle the set of exposures related to the material. The one or more processors may determine a score for the material based on the category of materials and the exposure preparedness level associated with the material. The score may indicate the exposure related to the material. The one or more processors may perform an action related to the material based on the score for the material.

According to some possible implementations, a non-transitory computer-readable medium may store one or more instructions that, when executed by one or more processors, cause the one or more processors to receive data related to an item. The data may permit an analysis of an exposure related to the item. The one or more instructions, when executed by the one or more processors, may cause the one or more processors to process the data to determine a category of items for the item. The category of items may indicate a set of exposures, related to the item, to an organization. The one or more instructions, when executed by the one or more processors, may cause the one or more processors to determine a first score related to the item based on the category of items. The first score may indicate the category of items. The one or more instructions, when executed by the one or more processors, may cause the one or more processors to process the data to determine an exposure preparedness level associated with the item. The exposure preparedness level may indicate a preparedness of the organization to handle the set of exposures related to the item. The one or more instructions, when executed by the one or more processors, may cause the one or more processors to determine a second score related to the item based on the exposure preparedness level. The second score may indicate the exposure preparedness level. The one or more instructions, when executed by the one or more processors, may cause the one or more processors to determine a third score for the item based on the first score and the second score. The third score may indicate the exposure related to the item. The one or more instructions, when executed by the one or more processors, may cause the one or more processors to perform an action related to the item based on the third score for the item. The action may reduce or eliminate the exposure related to the item.

According to some possible implementations, a method may include receiving, by a device, data to permit an analysis of an exposure related to a material. The data may relate to one or more of the material, a supplier of the material, an organization that receives the material from the supplier or provides the material to a customer, or the customer. The method may include processing, by the device, the data to determine a category of materials for the material. The category of materials may indicate a set of exposures, related to the material, to the organization. The method may include processing, by the device, the data to determine an exposure preparedness level associated with the material. The exposure preparedness level may indicate a preparedness of the organization to handle the set of exposures related to the material. The method may include determining, by the device, a score that accounts for the set of exposures related to the material or the exposure preparedness level. The score may indicate the exposure related to the material. The method may include performing, by the device, an action related to the material based on the score. The action may positively impact the exposure related to the material.

DETAILED DESCRIPTION

The following detailed description of example implementations refers to the accompanying drawings. The same reference numbers in different drawings may identify the same or similar elements.

An organization may use materials to produce an item and/or may be a supplier that provides the materials to another organization. The materials may be associated with various types of exposure (e.g., risk, such as from shortage of the materials, regulations related to quality and/or handling of the materials, importance of the materials based on use in particular products, a lack of a substitute material, etc.). The organization may lack a computer-based technique for identifying particular materials that are associated with a threshold level of exposure and/or for determining a level of preparedness of the organization for handling the exposures (e.g., risks) associated with the materials.

Some implementations, described herein, provide an exposure analysis platform that is capable of receiving information related to materials to be used to produce an item and/or to be provided by an organization to another organization, identifying particular materials associated with a threshold level of exposure, determining a level of preparedness of the organization to handle exposures associated with the materials, and/or performing an action to improve a preparedness of the organization for the exposures and/or to reduce or eliminate levels of exposure of the organization. In this way, the exposure analysis platform may automatically analyze information related to materials to permit a reduction or elimination of exposures related to the materials, to permit the organization to more accurately provide a guarantee related to the materials, and/or the like. This conserves processing resources relative to using a set of processing resources that do not efficiently determine exposures, provide minimal exposure information, are not equipped to determine such information, and/or the like (e.g., via faster processing, fewer errors, and/or the like). In addition, this improves operations of the organization by reducing or eliminating exposures associated with the materials, thereby conserving processing resources that would otherwise be consumed when problems occur due to the exposures. Further, this improves operations of the organization related to managing the exposures via automatic and objective analysis of information related to the exposures.

Figure 1A:
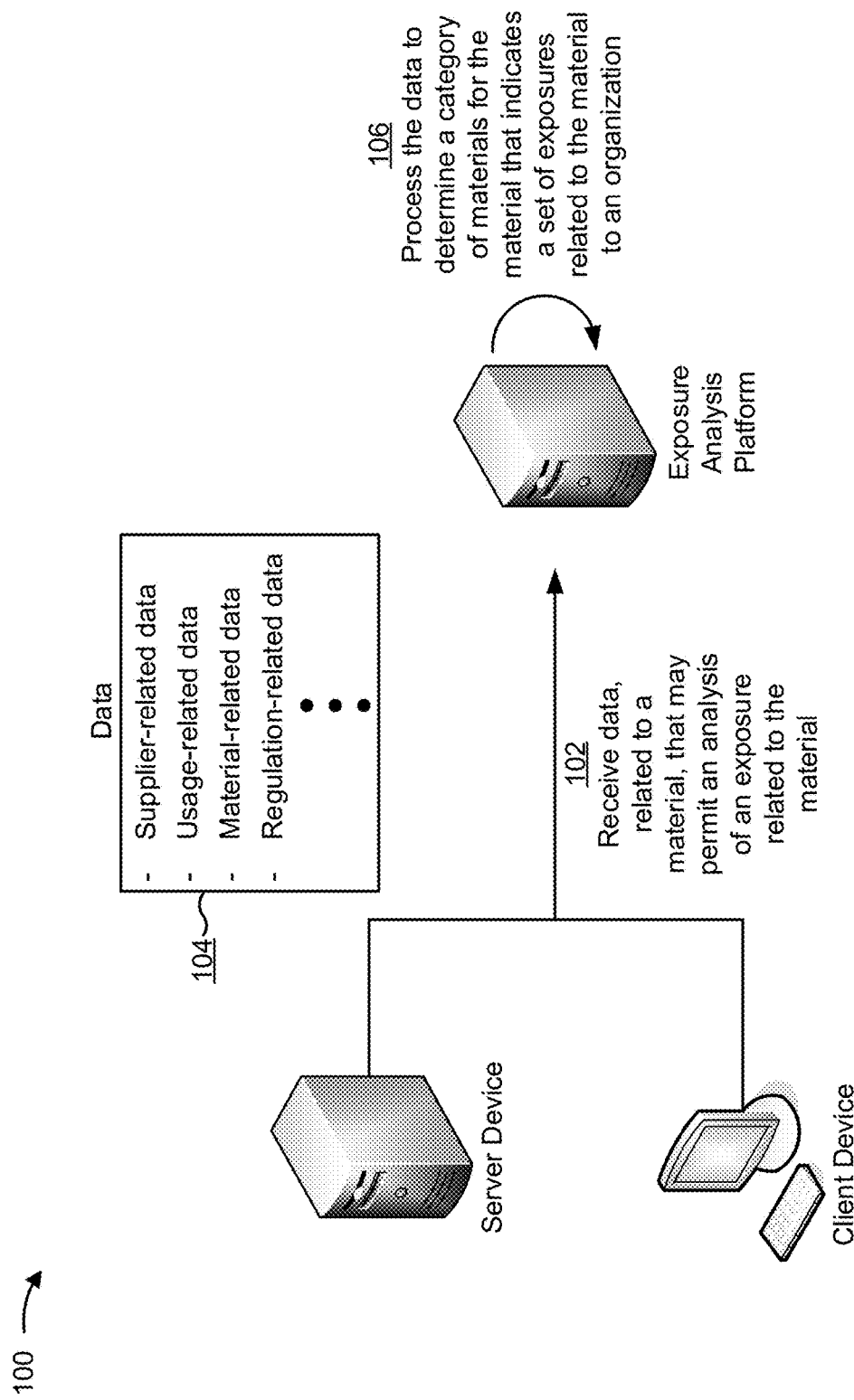
FIGS. 1A-1F are diagrams of an overview of an example implementation described herein.

FIGS. 1A-1F are diagrams of an overview of an example implementation 100 described herein. As shown in FIG. 1A, implementation 100 may include a server device, a client device, and an exposure analysis platform. Although FIG. 1A shows a single server device and a single client device, in practice, there may be hundreds, thousands, or millions, etc. of server devices and/or client devices in communication with the exposure analysis platform.

As shown in FIG. 1A, and by reference number 102, the exposure analysis platform may receive data, related to a material, that may permit an analysis of an exposure related to the material. For example, the exposure analysis platform may receive the data from the client device (e.g., which may be input from a user of the client device) and/or from the server device (e.g., which may be stored by the server device). In some implementations, the data may include thousands, millions, billions, etc. of data elements. In this way, the exposure analysis platform may receive a data set that cannot be processed manually or objectively by a human actor.

As shown by reference number 104, the data may include supplier-related data (e.g., data related to a relationship between an organization and a supplier, security stock of the material held by the supplier, such as available stock of the supplier that is not designated for any customer or associated with a particular order and may be used to prevent a shortfall in stock, etc.), usage-related data (e.g., data related to a manner in which an organization is to use the material, products in which the material is to be included, etc.), material-related data (e.g., data related to a shelf-life of the material, whether the material is classified as a hazardous material, etc.), regulation-related data (e.g., data related to the types of regulations that apply to the material, whether the supplier has been audited for satisfaction of any applicable regulations, etc.), a bill of materials that includes information identifying the material and other materials to be used in a product, a bill of items that includes information identifying an item and other items to be used in a product when analyzing an item), and/or the like.

The exposure analysis platform may process the data upon receiving the data. For example, the exposure analysis platform may process the data using natural language processing, text analysis, computational linguistics, and/or the like to identify a term and/or phrase included in the data. Additionally, or alternatively, and as another example, the exposure analysis platform may process the data to fix corrupted data elements included in the data, to format the data in a particular format, to aggregate the data (e.g., from different sources, of different file types, etc.), and/or the like. In this way, the exposure analysis platform may process the data so that the exposure analysis platform can quickly, efficiently, and accurately use the data, thereby conserving processing resources when using the data.

As shown by reference number 106, the exposure analysis platform may process the data to determine a category of materials for the material (or a category of items for an item when an item is being analyzed) that indicates a set of exposures of the material to an organization. For example, the exposure analysis platform may process the data to determine a category of materials for the material based on an importance of the material to an organization providing the material to a customer, to an organization that is to use the material to produce a product, and/or the like. The exposure analysis platform may determine a category of materials for the material based on exposures related to the material as determined from various perspectives (e.g., from a supplier perspective, a customer perspective, a perspective of an organization receiving the material from the supplier and providing the material, or a product including the material, to the customer, etc.).

For example, and from a supplier perspective, a material may be classified into a category of materials based on a quantity of suppliers from which the material can be obtained, whether a supplier of the organization has a history of satisfying deadlines with regard to providing the material, security stock of the material held by the supplier, and/or the like. Additionally, or alternatively, as another example and from a customer perspective, the exposure analysis platform may classify a material based on an industry in which the material is to be used (e.g., a medical industry, a pharmaceutical industry, an electronics industry, etc.), whether the customer considers the material to be important to a product of the customer, whether the customer can replace the material with an alternative material, and/or the like.

Additionally, or alternatively, as another example and from a perspective of an organization obtaining the material from a supplier and/or providing the material to a customer, the exposure analysis platform may classify the material based on a quantity of customers to which the organization provides the material, whether the organization bulk orders the material, and/or the like.

Figure 1B:
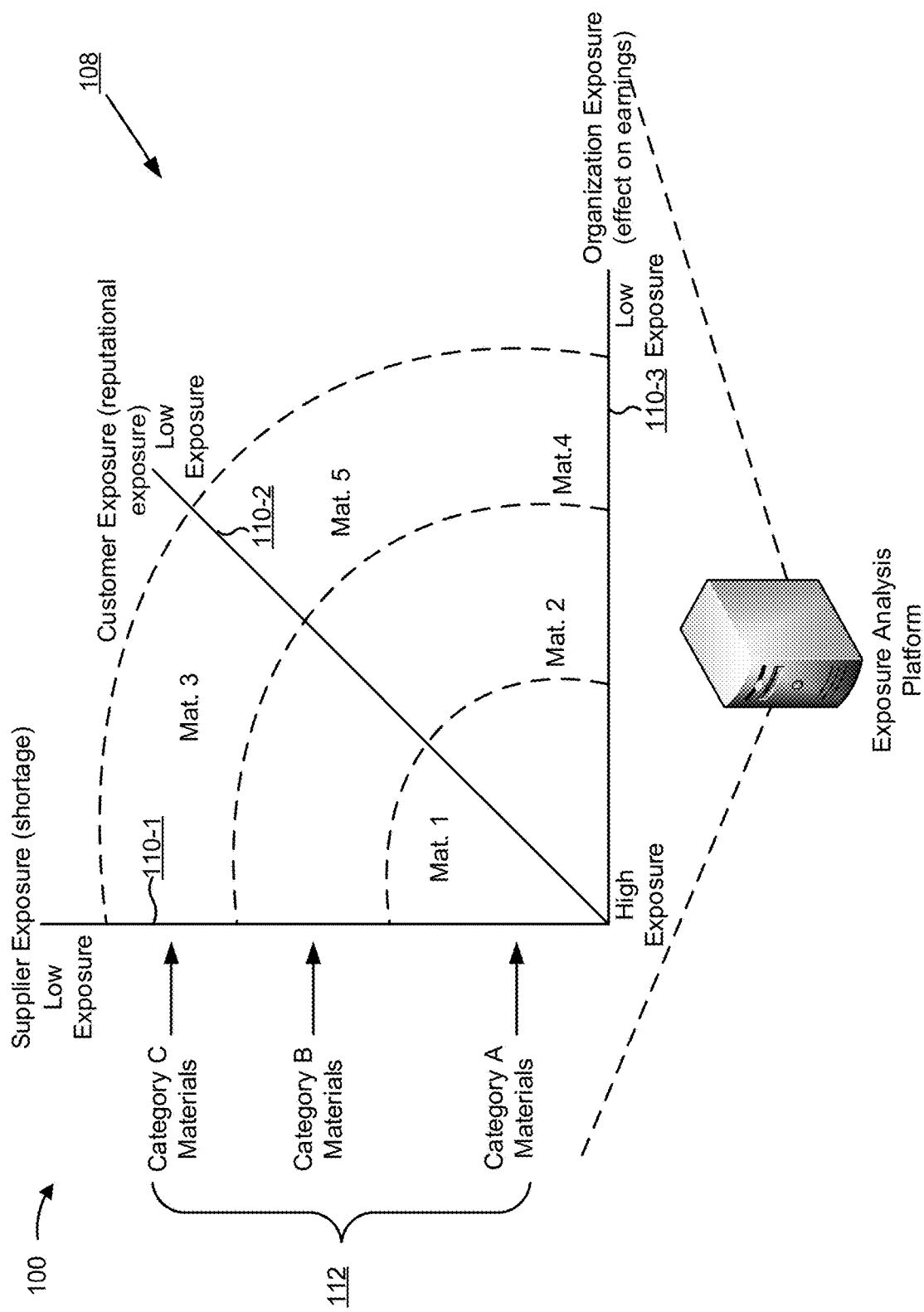

As shown in FIG. 1B, and by reference number 108, the exposure analysis platform may plot, on a chart, information identifying materials being analyzed (e.g., shown as "Mat. 1" for a first material, "Mat. 2" for a second material, etc.) to determine a category of the materials. For example, the exposure analysis platform may determine where on the chart to plot the information identifying the materials based on information associated with the materials satisfying a threshold, based on the information associated with the materials including particular terms and/or phrases, based on a score that the exposure analysis platform determines for the materials (as described in more detail elsewhere herein), based on determining that the information related to the materials is similar to other information related to other materials (e.g., determined using machine learning), and/or the like.

As shown by reference numbers 110-1 through 110-3, the chart may include a set of axes on which the information identifying the materials is plotted. For example, each of the axes may correspond to a perspective from which the exposure analysis platform processes the data related to the materials. For example, the axis labeled "Supplier Exposure" (shown by reference number 110-1) may correspond to the supplier perspective (e.g., shortage-related exposure), the axis labeled "Customer Exposure" (shown by reference number 110-2) may correspond to the customer perspective (e.g., reputation-related exposure, reputational impact exposure, regulatory exposure, etc.), and the axis labeled "Organization Exposure" (shown by reference number 110-3) may correspond to the perspective of an organization that receives the materials from the supplier and/or provides the materials to the customer (e.g., exposure related to an effect on earnings of an organization).

As shown by reference number 112 and by the dashed-curved lines, the exposure analysis platform may determine a category of materials for the materials being analyzed based on where the exposure analysis platform plots information identifying the materials on the chart. For example, the exposure analysis platform may determine that a particular material is to be classified in a first category of materials (e.g., shown as "Category A Materials") when the exposure analysis platform determines that the particular materials are associated with a first threshold level of exposure (e.g., high exposure) from the three perspectives described above.

Additionally, or alternatively, and as another example, the exposure analysis platform may determine that a particular material is to be classified in a second category of materials (e.g., shown as "Category B Materials") when the exposure analysis platform determines that the particular material is associated with a second threshold level of exposure (e.g., medium exposure) from the three perspectives described above. Additionally, or alternatively, and as another example, the exposure analysis platform may determine that a particular material is to be classified in a third category of materials (e.g., shown as "Category C Materials") when the exposure analysis platform determines that the particular material is associated with a third threshold level of exposure (e.g., low exposure) from the three perspectives described above.

Figure 1C:
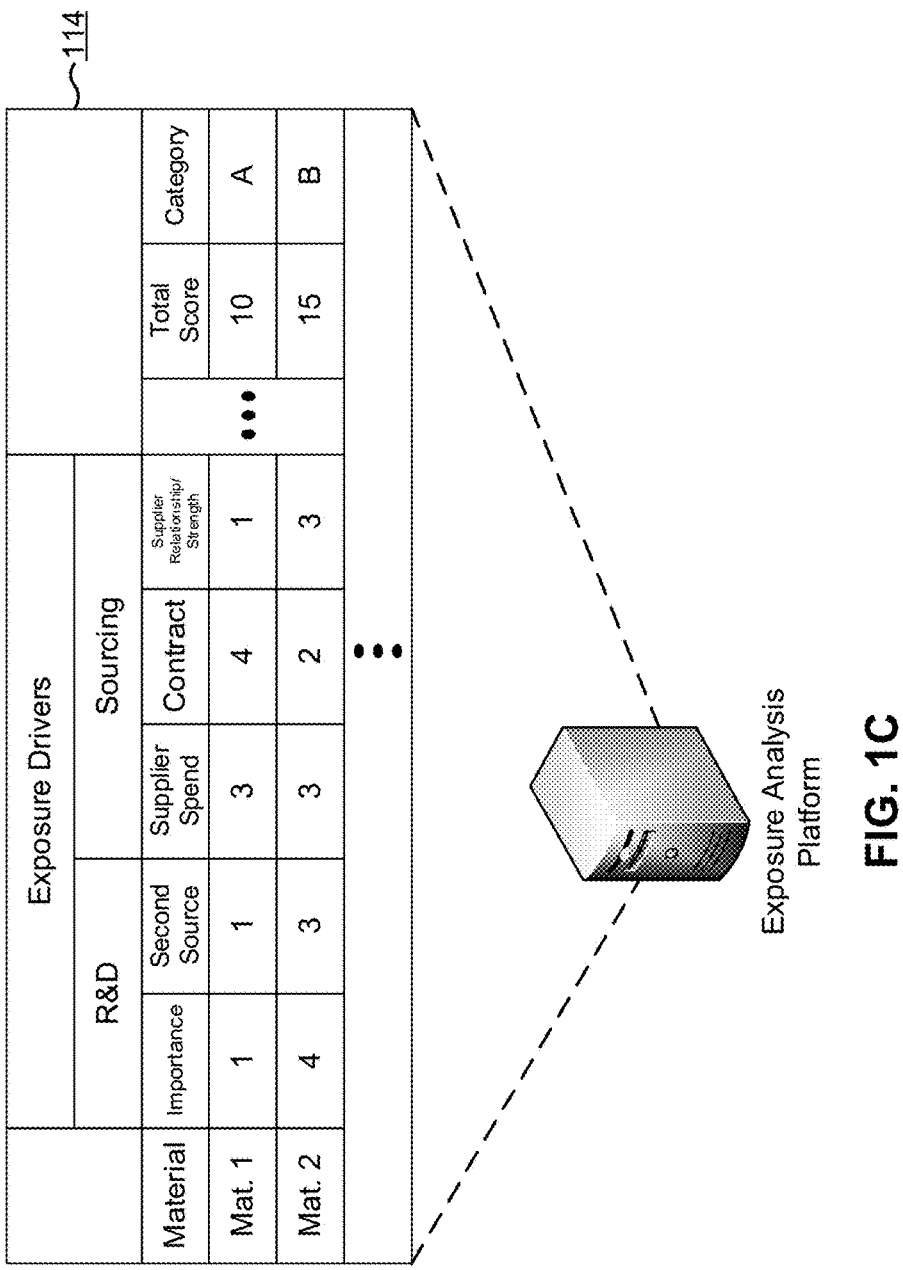

As shown in FIG. 1C, and by reference number 114, the exposure analysis platform may determine a score for each of the materials being analyzed. The score may be an aggregation of a set of scores for various factors related to each material (e.g., exposure drivers related to the materials, such as factors, characteristics, etc. related to the materials that cause the materials to be associated with various exposures). For example, the exposure analysis platform may determine a score that indicates an importance of the material to an organization, whether an organization can obtain, or a difficulty of obtaining, the material from a second source (e.g., another supplier), an amount an organization is spending to obtain the materials, whether a contract with a supplier providing the materials includes favorable terms to the organization receiving the materials, a relationship of an organization with a supplier of the materials, or strength thereof (e.g., as indicated by a quantity of contract renewals between the organization and the supplier, a quantity of orders by the organization from the supplier, a length of time the organization has been ordering from the supplier, etc.), and/or the like.

The exposure analysis platform may determine a total score for a material based on the scores determined for the various factors related to the material. The exposure analysis platform may use the score to determine a category of materials for the material and/or may determine the score based on where on the chart the exposure analysis platform plotted information related to the material (e.g., as described above with respect to FIG. 1B). In this way, the exposure analysis platform may determine a score for a material and/or a category of materials for the material that indicates a set of exposures associated with the material.

Figure 1D:
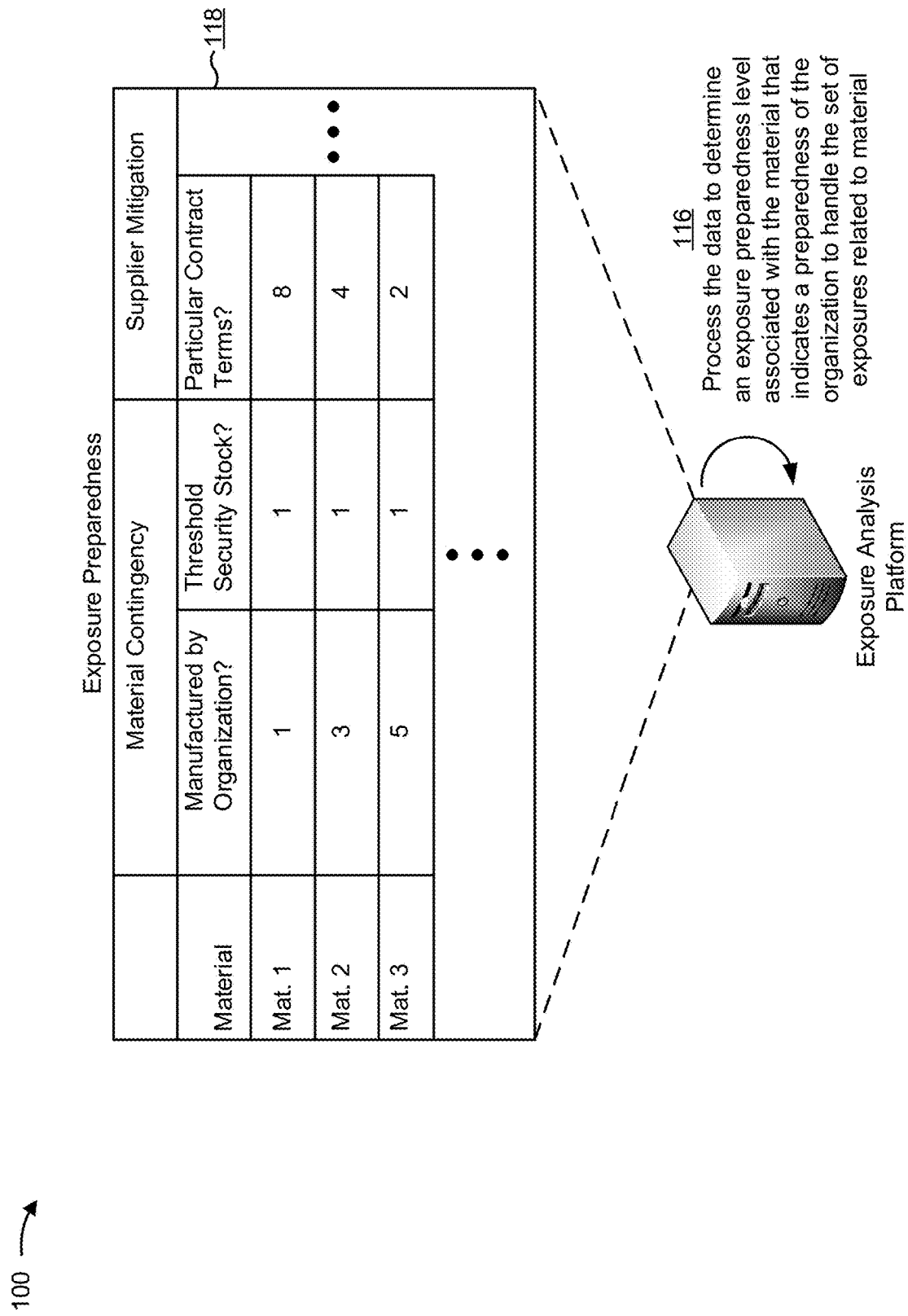

As shown in FIG. 1D, and by reference number 116, the exposure analysis platform may process the data to determine an exposure preparedness level, associated with the material, that indicates a preparedness of the organization to handle the set of exposures related to the material. For example, the exposure analysis platform may process the data to determine material contingencies related to the material (or item contingencies related to an item when an item is being analyzed) that mitigate exposures related to the material (e.g., whether the material is, or can be, produced internally by the organization rather than received from a supplier, whether the organization has a threshold security stock of the material, etc.). Additionally, or alternatively, and as another example, the exposure analysis platform may process data to determine supplier mitigations, related to a supplier of the material, that mitigate exposures associated with the supplier of the material (e.g., whether a contract between the organization and the supplier includes particular contract terms, whether the supplier is monitoring particular metrics during production of the material, etc.).

As shown by reference number 118, the exposure analysis platform may determine scores for each of the material contingencies and/or supplier mitigations that the exposure analysis platform determined for the materials being analyzed. The exposure analysis platform may determine a total score for the material contingencies and/or the supplier mitigations (e.g., by summing the scores determined for the material contingencies and the supplier mitigations), as described in more detail elsewhere herein. For example, the exposure analysis platform may determine an exposure preparedness score that indicates an exposure preparedness level of an organization for a material.

Figure 1E:
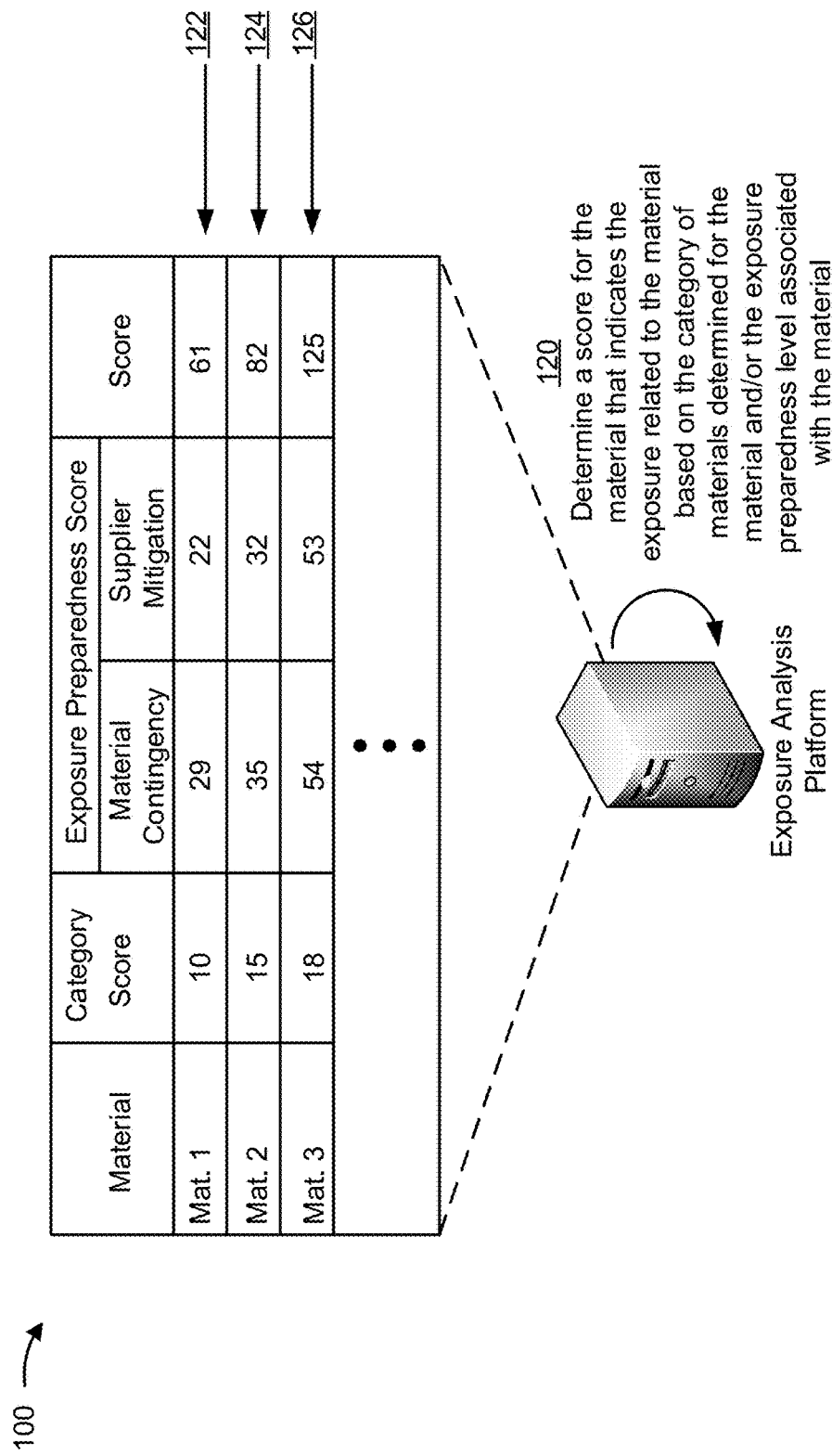

As shown in FIG. 1E, and by reference number 120, the exposure analysis platform may determine a score for the material that indicates the exposure related to the material based on the category of materials determined for the material and/or the exposure preparedness level associated with the material. For example, the exposure analysis platform may determine a score based on a score determined for the category of materials for the material, a score determined for the material contingencies related to the material, a score determined for the supplier mitigations related to the material, and/or the like (e.g., by summing the scores). The score that the exposure analysis platform determines may indicate the exposure associated with the material (e.g., based on the score satisfying a threshold). In this way, the exposure analysis platform may determine a score for the material that accounts for a set of exposures related to the material, and any actions, factors, and/or the like, related to the material and/or a supplier of the material that reduce or eliminate the set of exposures.

As shown by reference number 122, and for example, the exposure analysis platform may determine that a first score for a first material (e.g., shown as "Mat. 1") satisfies a first threshold, thereby indicating a first level of exposure (e.g., high exposure) related to the first material. As shown by reference number 124, and for example, the exposure analysis platform may determine that a second score determined for a second material (e.g., shown as "Mat. 2") satisfies a second threshold, thereby indicating a second level of exposure (e.g., medium exposure) related to the second material. As shown by reference number 126, and for example, the exposure analysis platform may determine that a third score determined for a third material (e.g., shown as "Mat. 3")

satisfies a third threshold, thereby indicating a third level of exposure (e.g., low exposure) related to the third material.

Figure 1F:
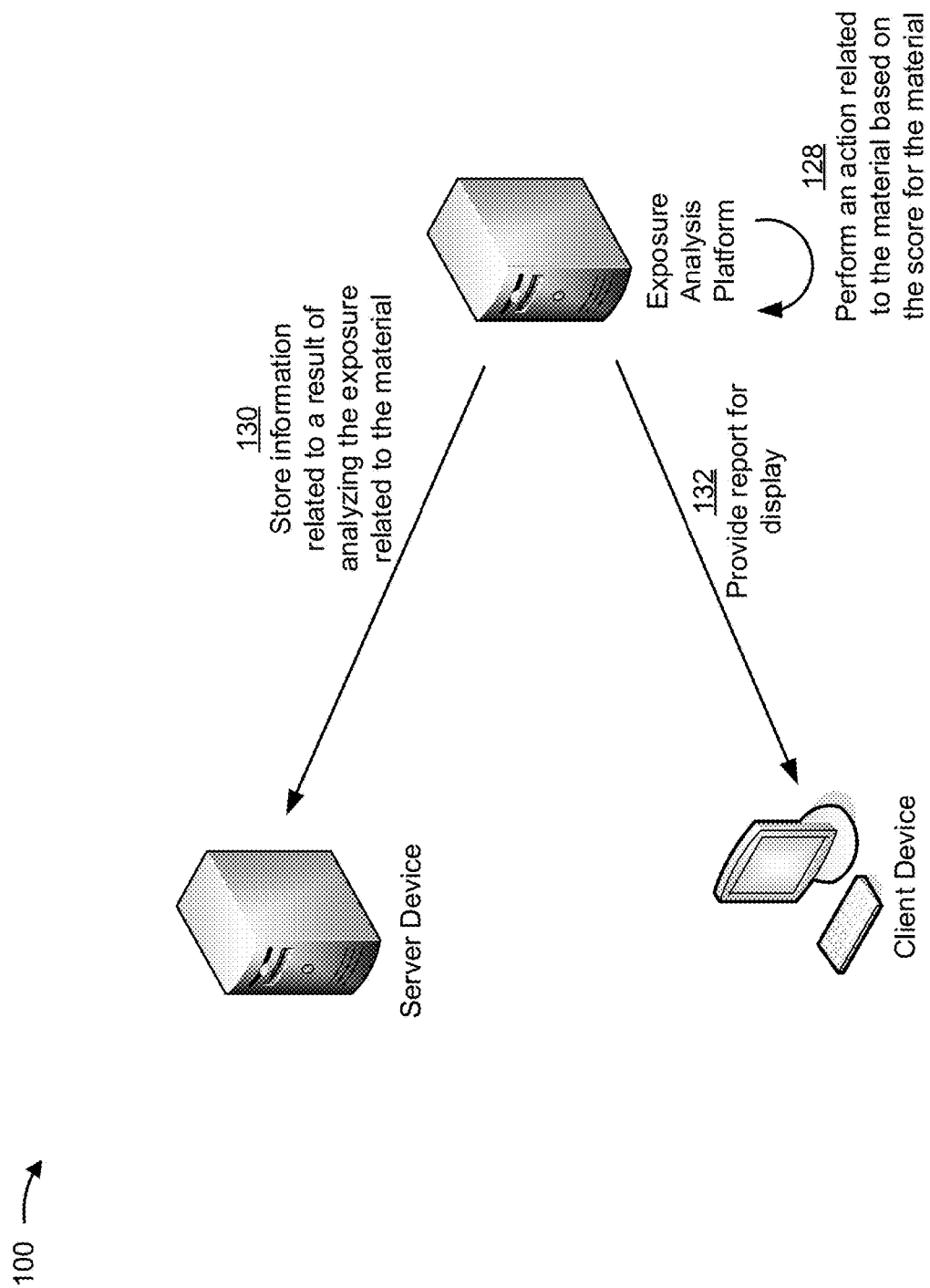

As shown in FIG. 1F, and by reference number 128, the exposure analysis platform may perform an action related to the material based on the score for the material, such as generate a recommendation to reduce or eliminate an exposure related to a material. As shown by reference number 130, when performing the action, the exposure analysis platform may store, in the server device, information related to a result of analyzing the exposure related to the material (e.g., to improve future analyses, or analyses by other exposure analysis platforms). As shown by reference number 132, when performing the action, the exposure analysis platform may provide a report to the client device for display (e.g., a report that the exposure analysis platform generated and that includes a result of analyzing the exposure related to the material).

In this way, the exposure analysis platform may automatically analyze information related to materials to permit a reduction or elimination of exposure related to the materials, to permit the organization to more accurately provide a guarantee related to the materials, and/or the like. This conserves processing resources relative to using a set of processing resources that do not efficiently determine exposures, provide minimal exposure information, are not equipped to determine such information, and/or the like (e.g., via faster processing, fewer errors, etc.). In addition, this improves operations of the organization by reducing or eliminating exposures associated with the materials, thereby conserving processing resources that would otherwise be consumed when problems occur due to the exposures. Further, this improves operations of the organization related to managing the exposures via automatic and objective analysis of information related to the exposures. Further, this improves analysis of a material and/or recommendation generation via predictive analysis of information (e.g., to mitigate future shortages of a material), relative to a reactive analysis that analyzes information related to events that have already occurred (e.g., shortages that have occurred due to natural disasters, war, etc.).

Further, in this way, the exposure analysis platform may facilitate control and management of exposure reduction activities through generated reports. For example, the reports may permit a manager to confirm that an individual responsible for reducing exposure is doing so in accordance with prompted activities related to reducing exposure (e.g., through human interface or data interface, such as by using data to confirm exposure reduction). In other words, the exposure analysis platform may permit a manager to monitor efforts related to reducing exposure of an organization. For example, using various reports that the exposure analysis platform generates over time, the manager may be capable of tracking changes to areas of exposure for an organization, such as to determine whether subordinates of the manager are working on reducing exposure in a prioritized manner.

As indicated above, FIGS. 1A-1F are provided merely as an example. Other examples are possible and may differ from what was described with regard to FIGS. 1A-1F. Although FIGS. 1A-1F were described with respect to a material, the implementations apply equally to an item, a product, a good, a service, a component, a tactic, and/or the like.

Figure 2:
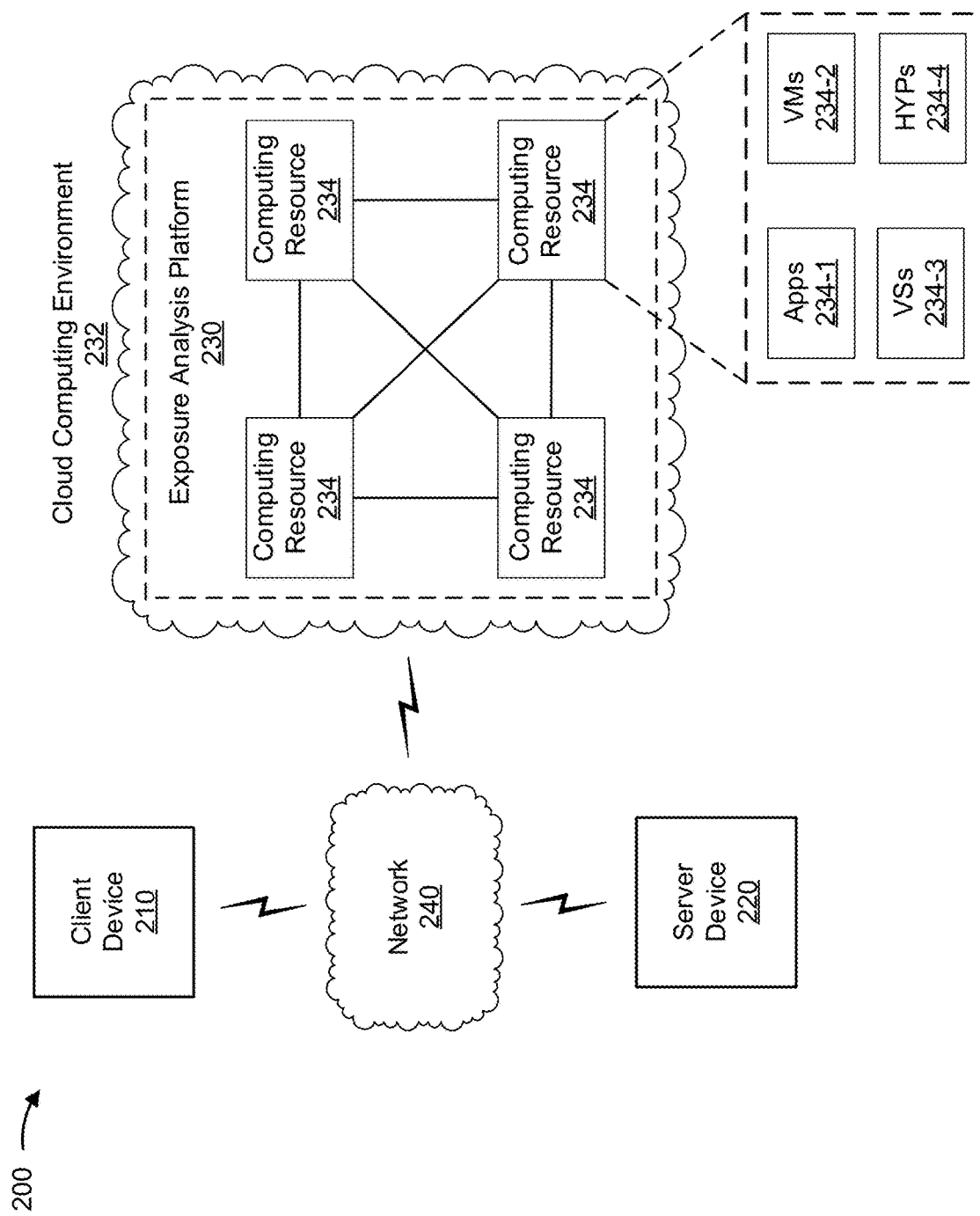
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a server device 220, an exposure analysis platform 230 provided within a cloud computing environment 232 that includes a set of computing resources 234, and a network 240. Devices of environment 200 may interconnect via wired connections, wireless connections, or a combination of wired and wireless connections.

Client device 210 includes one or more devices capable of receiving, generating, storing, processing, and/or providing information associated with a material. For example, client device 210 may include a desktop computer, a mobile phone (e.g., a smart phone or a radiotelephone), a laptop computer, a tablet computer, a gaming device, a wearable communication device (e.g., a smart wristwatch or a pair of smart eyeglasses), or a similar type of device. In some implementations, client device 210 may provide data associated with a material or a bill of materials for a product (e.g., data stored by client device 210 and or data input by a user of client device 210), as described elsewhere herein. Additionally, or alternatively, client device 210 may receive information identifying a result of an analysis performed by exposure analysis platform 230 (e.g., to be provided for display), as described elsewhere herein. While a single client device 210 is shown in FIG. 2, in practice, there can be hundreds, thousands, millions, etc. of client devices 210 in communication with exposure analysis platform 230.

Server device 220 includes one or more devices capable of receiving, generating, storing, processing, and/or providing information associated with a material. For example, server device 220 may include a server (e.g., in a data center or a cloud computing environment), a data center (e.g., a multi-server micro data center), a workstation computer, a virtual machine (VM) provided in a cloud computing environment, or a similar type of device. In some implementations, server device 220 may provide, to exposure analysis platform 230, information related to a material, as described elsewhere herein. Additionally, or alternatively, server device 220 may store information related to a result of an analysis performed by exposure analysis platform 230 (e.g., to facilitate machine learning), as described elsewhere herein. While a single server device 220 is shown in FIG. 2, in practice, there can be hundreds, thousands, millions, etc. of server devices 220 in communication with exposure analysis platform 230.

Exposure analysis platform 230 includes one or more devices capable of automatically analyzing material-related exposure (e.g., to reduce or eliminate an exposure related to a material). For example, exposure analysis platform 230 may include a cloud server or a group of cloud servers. In some implementations, exposure analysis platform 230 may be designed to be modular such that certain software components can be swapped in or out depending on a particular need. As such, exposure analysis platform 230 may be easily and/or quickly reconfigured for different uses.

In some implementations, as shown in FIG. 2, exposure analysis platform 230 may be hosted in cloud computing environment 232. Notably, while implementations described herein describe exposure analysis platform 230 as being hosted in cloud computing environment 232, in some implementations, exposure analysis platform 230 may not be cloud-based (i.e., may be implemented outside of a cloud computing environment) or may be partially cloud-based.

Cloud computing environment 232 includes an environment that hosts exposure analysis platform 230. Cloud computing environment 232 may provide computation, software, data access, storage, and/or other services that do not require end-user knowledge of a physical location and configuration of a system and/or a device that hosts exposure analysis platform 230. As shown, cloud computing environment 232 may include a group of computing resources 234 (referred to collectively as "computing resources 234" and individually as "computing resource 234").

Computing resource 234 includes one or more personal computers, workstation computers, server devices, or another type of computation and/or communication device. In some implementations, computing resource 234 may host exposure analysis platform 230. The cloud resources may include compute instances executing in computing resource 234, storage devices provided in computing resource 234, data transfer devices provided by computing resource 234, etc. In some implementations, computing resource 234 may communicate with other computing resources 234 via wired connections, wireless connections, or a combination of wired and wireless connections.

As further shown in FIG. 2, computing resource 234 may include a group of cloud resources, such as one or more applications ("APPs") 234-1, one or more virtual machines ("VMs") 234-2, one or more virtualized storages ("VSs") 234-3, and/or one or more hypervisors ("HYPs") 234-4.

Application 234-1 includes one or more software applications that may be provided to or accessed by one or more devices of environment 200. Application 234-1 may eliminate a need to install and execute the software applications on devices of environment 200. For example, application 234-1 may include software associated with exposure analysis platform 230 and/or any other software capable of being provided via cloud computing environment 232. In some implementations, one application 234-1 may send/receive information to/from one or more other applications 234-1, via virtual machine 234-2.

Virtual machine 234-2 includes a software implementation of a machine (e.g., a computer) that executes programs like a physical machine. Virtual machine 234-2 may be either a system virtual machine or a process virtual machine, depending upon use and degree of correspondence to any real machine by virtual machine 234-2. A system virtual machine may provide a complete system platform that supports execution of a complete operating system ("OS"). A process virtual machine may execute a single program, and may support a single process. In some implementations, virtual machine 234-2 may execute on behalf of a user (e.g., a user of client device 210), and may manage infrastructure of cloud computing environment 232, such as data management, synchronization, or long-duration data transfers.

Virtualized storage 234-3 includes one or more storage systems and/or one or more devices that use virtualization techniques within the storage systems or devices of computing resource 234. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 234-4 provides hardware virtualization techniques that allow multiple operating systems (e.g., "guest operating systems") to execute concurrently on a host computer, such as computing resource 234. Hypervisor 234-4 may present a virtual operating platform to the guest operating systems, and may manage the execution of the guest operating systems. Multiple instances of a variety of operating systems may share virtualized hardware resources.

Network 240 includes one or more wired and/or wireless networks. For example, network 240 may include a cellular network (e.g., a long-term evolution (LTE) network, a code division multiple access (CDMA) network, a 3G network, a 4G network, a 5G network, or another type of cellular network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
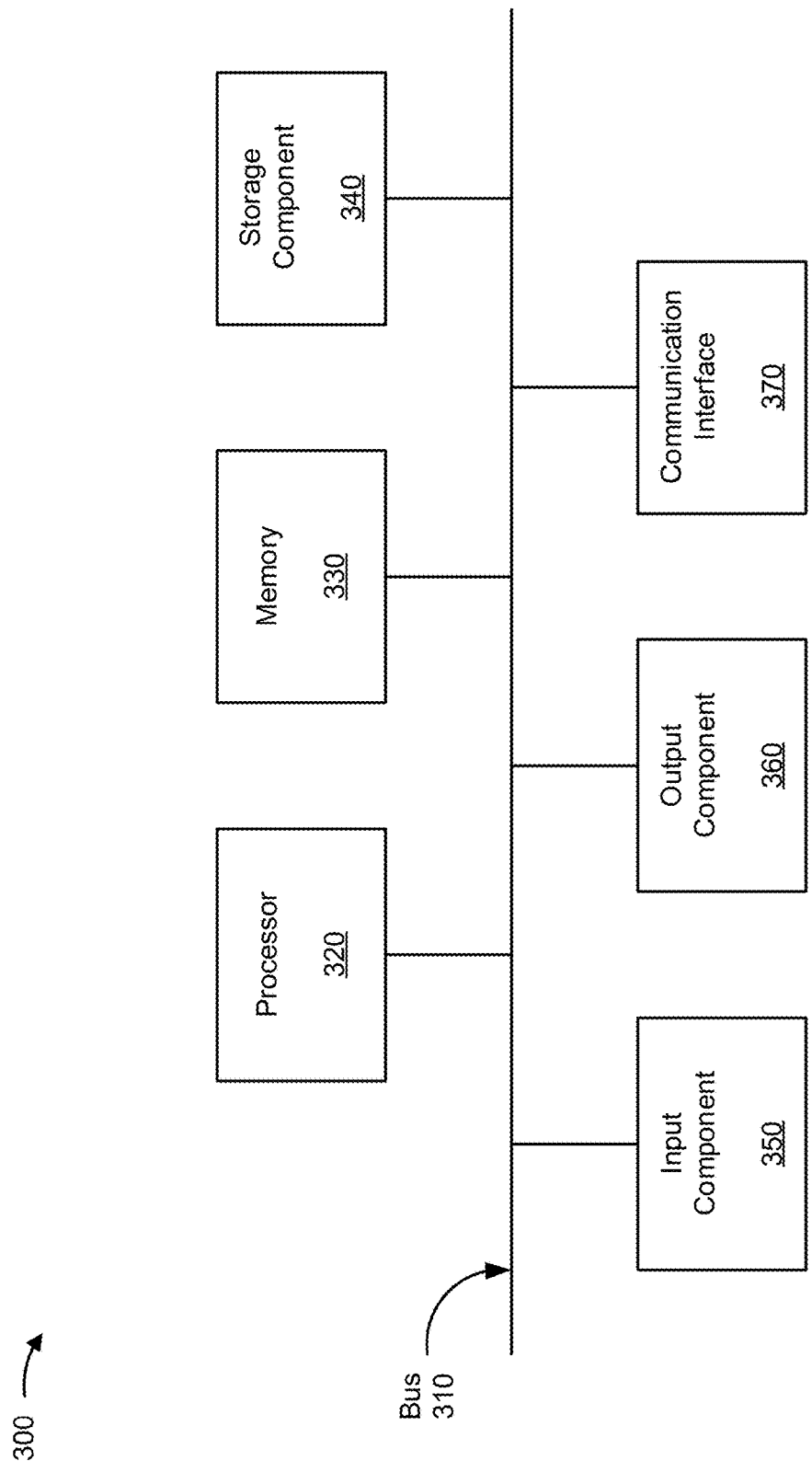
FIG. 3 is a diagram of example components of one or more devices of FIG. 2.

FIG. 3 is a diagram of example components of a device 300. Device 300 may correspond to client device 210, server device 220, exposure analysis platform 230, and/or computing resource 234. In some implementations, client device 210, server device 220, exposure analysis platform 230, and/or computing resource 234 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operations and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
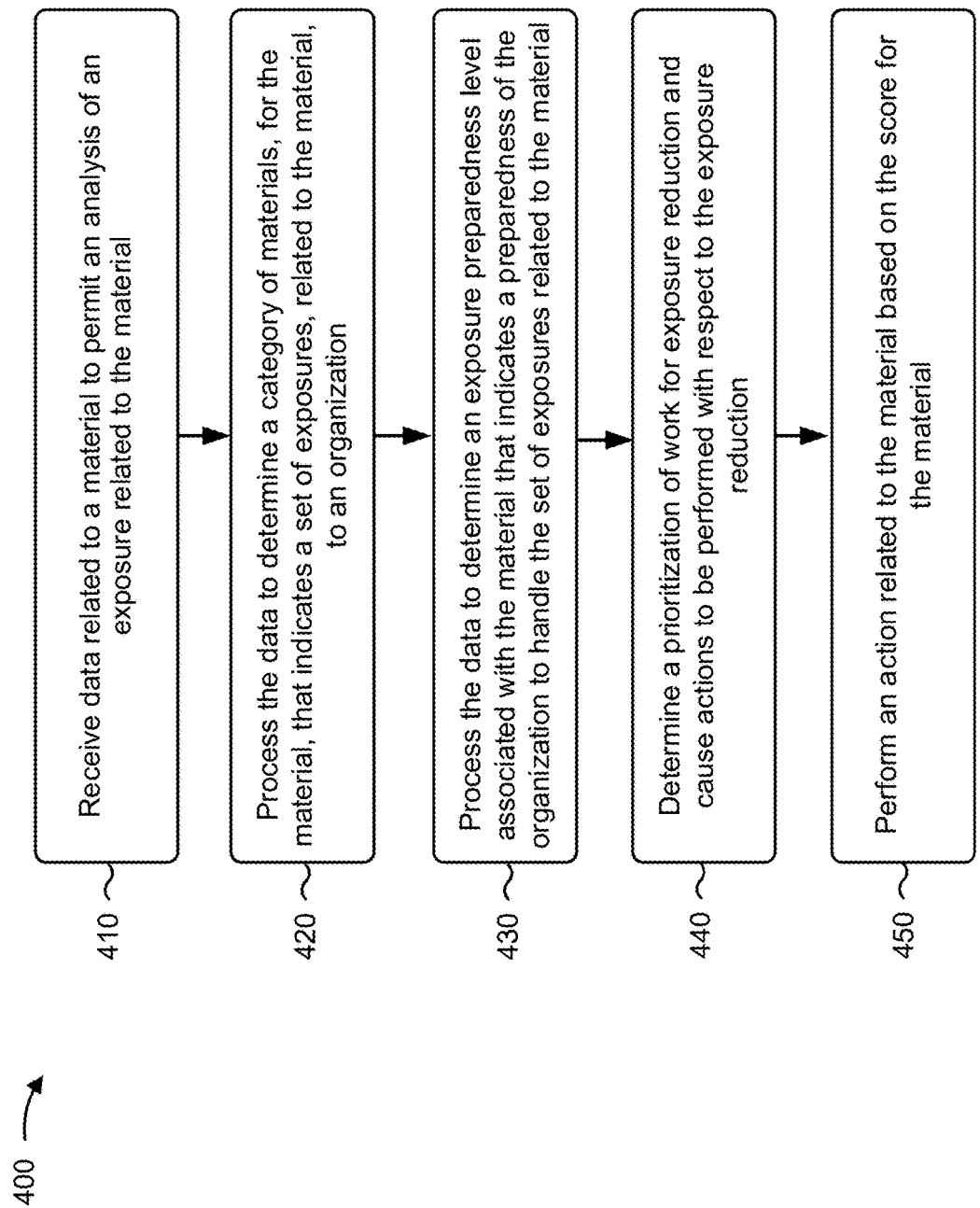
FIG. 4 is a flow chart of an example process for automatic analysis of material-related exposure and/or exposure strategy prioritization.

FIG. 4 is a flow chart of an example process 400 for automatic analysis of material-related exposure and/or exposure strategy prioritization. In some implementations, one or more process blocks of FIG. 4 may be performed by exposure analysis platform 230. In some implementations, one or more process blocks of FIG. 4 may be performed by another device or a group of devices separate from or including exposure analysis platform 230, such as client device 210 and/or server device 220.

As shown in FIG. 4, process 400 may include receiving data related to a material to permit an analysis of an exposure related to the material (block 410). For example, exposure analysis platform 230 may receive data related to a material to permit an analysis of an exposure related to the material. In some implementations, exposure analysis platform 230 may receive the data periodically, according to a schedule, based on input from a user of client device 210, from client device 210 (e.g., via input from a user of client device 210), from server device 220, based on requesting the data, and/or the like. In some implementations, the data may include thousands, millions, billions, etc. of data elements. In this way, exposure analysis platform 230 may receive a data set that cannot be processed manually or objectively by a human actor.

In some implementations, a material may include a substance of which an item (e.g., a product, an item of manufacture, etc.) is comprised, such as a metal, a plastic, a fabric, a chemical, and/or the like. In some implementations, a material may be processed or unprocessed, raw or refined, etc. Although implementations are described herein with respect to a material, the implementations apply equally to an item, a component used to produce a good, service, a food material, a crop, and/or the like.

In some implementations, data that exposure analysis platform 230 receives may relate to a material, a supplier of a material to an organization, a customer of the organization, the organization that receives the material and provides the material, or a product that includes the material, material contingencies implemented by the organization (e.g., actions, factors, etc. that reduce or eliminate exposures related to the material), supplier mitigations implemented by the supplier (e.g., actions, factors, etc. that reduce or eliminate exposures related to the supplier), and/or the like. For example, the data may identify a quantity of sources of the material (e.g., a quantity of suppliers), an importance of the material to a customer (e.g., types of products in which the material is to be used, industries in which the material is to be used, etc.), whether the material is a commodity or is specially ordered, regulations that apply to the material, revenue and/or profit generated from a sale of the material and/or a product that includes the material, whether the material is controlled by a contract with a threshold amount of time for the term of the contract, whether alternative materials to the material are available, macro (e.g., global) price trends related to the material, reputational harm to an organization and/or a customer if the organization fails to provide the material or a product that includes the material to the customer, and/or the like.

Additionally, or alternatively, and as another example related to a material, the data may identify technical characteristics of the material, a manner of use of the material within a process or inclusion in a product, whether a quality of the material has been validated, an amount of time and/or a cost needed to obtain an alternative source of the material (e.g., a time and/or cost of finding, testing, and validating an alternative source of the material), a function of a product in which the material is included (e.g., an intravenous function, a mechanical function, etc.), a shelf life of the material, and/or the like.

Additionally, or alternatively, and as another example related to a supplier, the data may identify a historical performance of the supplier (e.g., with regard to meeting deadlines, satisfying threshold quality specifications, etc.), whether the supplier is difficult to work with (e.g., as rated by employees, based on a quantity of complaints the organization has submitted to the supplier, etc.), whether a supplier is on a preferred supplier list of the organization or is recognized by a third party (e.g., an industry association or trade association) as being a high performing supplier, a geopolitical environment of a location of the supplier, a value provided to the supplier by the organization (e.g., an amount of money provided to the supplier for various materials), a percentage of the supplier's revenue or profit that the organization represents, a size of the supplier relative to the organization (e.g., in terms of a quantity of employees, revenue, etc.), whether a contract is in place between the supplier and the organization for the material, a quantity and/or types of terms included in the contract, whether performance metrics are included in the contract, whether the supplier and the organization have entered into a supplier agreement rather than a contract, and/or the like.

Additionally, or alternatively, and as another example related to a customer of the organization, the data may identify a relationship, or strength thereof, between the customer and the organization (e.g., in terms of an amount of time from an initial transaction between the organization and the customer, a quantity of transactions between the customer and the organization, etc.), whether the organization identifies a customer as a preferred customer (or the customer is paying for a threshold guarantee), and/or the like. In some implementations, a customer may include an internal customer of the organization (e.g., an assembly department, a research and development department, etc.) or an external customer (e.g., a consumer or another organization).

Additionally, or alternatively, and as another example related to material contingencies, the data may identify whether a material provided to a customer is, or can be, produced by the organization and/or by a partner of the organization, whether the organization has confirmed security stock held by the organization and/or a supplier (or whether a threshold amount of time has elapsed from the last time the organization confirmed the security stock of the supplier and/or the organization), whether the organization has identified and/or validated alternative suppliers of the material, whether security stocks are being actively managed in terms of shelf life of the material, demand for the material, etc., whether the organization and/or the supplier has separate security stock for preferred customers, whether the organization has physically inspected security stock of the supplier, whether the material has been analyzed in accordance with regulations or other rules and/or a result of such analysis, price stability of the material (e.g., global price trends, whether price protection terms are included in a contract for the material, etc.), packaging, shipping, handling, and/or transportation used and/or needed for the material, a result of a failure mode effects analysis (FMEA), and/or the like.

Additionally, or alternatively, and as another example related to supplier mitigations, the data may identify whether a supplier has been analyzed by the organization in terms of quality, whether the supplier meets certain quality standards (e.g., International Organization for Standardization (ISO) 9000), whether the supplier implements a quality management system, audit procedures of the supplier, a financial status of the supplier, a capacity of the supplier (e.g., a capability of the supplier to handle unexpected increases or decreases in demand), whether the supplier implements particular metrics to monitor operations of the supplier, whether contract terms of a contract between the supplier and the organization are structured with respect to the metrics, whether the supplier permits on-site audits, a frequency at which the supplier permits on-site audits, an amount of notice the supplier requires to perform an on-site audit, whether the organization has completed an on-site audit of the supplier, an amount of time since a supplier profile for the supplier, stored by organization, has been updated, annual and/or quarterly reports for the supplier, a product portfolio of the supplier, whether the organization has selected a supplier that supplies organizations similar to the organization (e.g., as determined using machine learning), whether the organization has physically inspected security stocks of the supplier, whether a contract between the organization and the supplier requires a security stock, whether the supplier uses distributed locations for a security stock, recovery and/or continuity operations of the supplier, and/or the like.

Additionally, or alternatively, the data may include any other data related to a material, a supplier of a material, a customer to receive a material, an organization that receives a material from a supplier and either provides the material to a customer or provides a product that includes the material to a customer, and/or the like. For example, exposure analysis platform 230 may receive information identifying a bill of materials for a product and may request the data for each of the materials included in the bill of materials. Additionally, or alternatively, and as another example, exposure analysis platform 230 may receive information identifying a product to be produced by a customer and/or provided to a customer, may determine the materials included in the product (e.g., by performing a lookup of information identifying the product, by generating a bill of materials, etc.), and may request data related to each of the materials included in the product.

In some implementations, exposure analysis platform 230 may receive the data from various departments within an organization, from various parties external to the organization, and/or the like. In some implementations, the data may include text data (e.g., a document, a webpage, a text file, etc.), audio data (e.g., audio from an interview of a subject matter expert associated with the organization), video data (e.g., a video associated with an advertisement of a supplier), input from a user of client device 210, a chart, a graph, and/or the like.

In some implementations, exposure analysis platform 230 may process the data using a technique prior to using the data. For example, exposure analysis platform 230 may process text data using a natural language processing technique, a text analysis technique, a computational linguistics technique, an artificial intelligence technique, and/or the like to identify a term and/or phrase included in the data. Additionally, or alternatively, and as another example, exposure analysis platform 230 may process audio data using an automatic speech recognition (ASR) technique, a computer speech recognition technique, a speech-to-text (STT) technique, and/or the like. Additionally, or alternatively, and as another example, exposure analysis platform 230 may process the data using a machine learning technique or an artificial intelligence technique to identify a pattern related to the data, a trend related to the data, whether the data is similar to other data, a classification of the data, and/or the like.

In some implementations, exposure analysis platform 230 may perform other processing related to the data prior to using the data. For example, exposure analysis platform 230 may fix corrupted data elements in the data (e.g., by obtaining or generating replacement data), combine data elements, separate data elements, aggregate data elements from different sources or of different file types (e.g., a text file type, a comma-separated-values (CSV) file type, a spreadsheet file type, etc.), normalize data elements, apply a uniform formatting to data elements, and/or the like. This conserves processing resources of exposure analysis platform 230 by reducing errors that may occur from use of data containing errors, data that is formatted differently, and/or the like.

In some implementations, exposure analysis platform 230 may identify a material for which to receive data based on a customer to which the material is provided or to be provided. For example, exposure analysis platform 230 may identify a set of customers that order a threshold quantity of materials, that are identified as preferred customers, that provide a threshold value to the organization, and/or the like, and may identify materials provided to those customers as materials for which to receive data. In this way, exposure analysis platform 230 may identify a subset of customers for which exposure analysis platform 230 is to analyze data related to materials provided to the subset of customers. This conserves processing resources of exposure analysis platform 230 by reducing or eliminating a need for exposure analysis platform 230 to analyze data related to all materials provided to all customers.

In this way, exposure analysis platform 230 may receive data related to a material to permit exposure analysis platform 230 to process the data.

As further shown in FIG. 4, process 400 may include processing the data to determine a category of materials, for the material, that indicates a set of exposures, related to the material, to an organization (block 420). For example, exposure analysis platform 230 may process the data to determine a category of materials, for the material, that indicates a set of exposures, related to the material, to an organization. In some implementations, exposure analysis platform 230 may process the data after receiving the data from client device 210 and/or server device 220, based on receiving an indication to process the data, and/or the like. In some implementations, exposure analysis platform 230 may process thousands, millions, billions, etc. of data elements, thereby processing a data set that cannot be processed manually or objectively by a human actor.

In some implementations, a category of materials may relate to and/or identify an exposure associated with the material (e.g., a high exposure, a medium exposure, or a low exposure), an importance of the material (e.g., a high importance, a medium importance, or a low importance), and/or the like (e.g., to an organization, a supplier for the organization, a customer of the organization, etc.). For example, a category of materials may be associated with high exposure materials or high importance materials (e.g., materials that are to be included in core products of a customer, materials that are to be used in a particular industry, such as the medical industry, etc.). In some implementations, exposure analysis platform 230 may use information identifying a category of materials for a material to determine actions to be performed by an organization, a supplier, and/or a customer to reduce or eliminate an exposure associated with a material, to reduce an exposure by a threshold amount, and/or the like, as described elsewhere herein.

In some implementations, exposure analysis platform 230 may process the data to determine a category of materials for the material based on an importance of the material to an organization providing the material to a customer, to a customer that is to use the material to produce a product, and/or the like. For example, exposure analysis platform 230 may determine an importance of the material based on input from a user of client device 210 that indicates an importance of the material. Additionally, or alternatively, and as another example, exposure analysis platform 230 may determine an importance of the material using machine learning and/or artificial intelligence to identify the importance (e.g., based on data associated with the material being similar to other data for another material with a known importance).

In some implementations, exposure analysis platform 230 may determine a category of materials for the material based on exposures, related to the material, from various perspectives (e.g., a supplier perspective, a customer perspective, a perspective of an organization receiving the material from the supplier and providing the material to the customer, etc.). For example, exposure analysis platform 230 may determine an exposure related to the material based on input from a user of client device 210 that indicates the exposure of the material. Additionally, or alternatively, and as another example, exposure analysis platform 230 may determine an exposure of the material using machine learning and/or artificial intelligence (e.g., based on data associated with the material being similar to other data for another material with a known exposure).

In some implementations, and as an example of determining a category of materials from a customer perspective, exposure analysis platform 230 may determine a category of materials based on a strength of a customer relationship between a customer and an organization providing the material, or a product that includes the material, an impact of the material on a profit of the customer, and/or the like. For example, exposure analysis platform 230 may determine that the material has a threshold impact on the profit of the customer (e.g., based on being included in a threshold quantity of products of the customer, particular products of the customer, etc.). Continuing with the previous example, exposure analysis platform 230 may determine that an exposure related to the material is high from a customer perspective based on the material having a threshold impact on the profit of the customer and may be associated with a particular category of materials.

Additionally, or alternatively, and as an example of determining a category of materials for the material from a supplier perspective, exposure analysis platform 230 may determine a category of materials for a material based on a difficulty of working with a supplier, a percentage of the supplier's revenue that orders of the material from the organization comprise, whether the organization and the supplier have entered into a contract, and/or the like. For example, exposure analysis platform 230 may determine that a material is associated with a high exposure based on determining that the organization and the supplier have not entered into a contract of a threshold duration for the material and may determine that the material is associated with a particular category of materials.

Additionally, or alternatively, and as an example of determining a category of materials for a material from a material perspective, exposure analysis platform 230 may determine the category of materials based on technical characteristics of the material (e.g., whether the material is identified as a hazardous material), a quantity of suppliers that can provide the material, a use of the material (e.g., medical use, industrial use, etc.), regulations that apply to the material, and/or the like. For example, exposure analysis platform 230 may determine that a material is associated with a high exposure, a medium exposure, or a low exposure based on determining that a threshold quantity of suppliers can provide the material, and may determine that the material is associated with a particular category of materials.

In some implementations, exposure analysis platform 230 may determine a category of materials for the material based on terms and/or phrases included in the data. For example, a particular term and/or phrase included in the data may indicate that an associated material is to be associated with a particular category of materials.

Additionally, or alternatively, exposure analysis platform 230 may determine a category of materials for the material based on a score associated with the material that indicates an exposure associated with the material. For example, exposure analysis platform 230 may determine a score for a material based on terms and/or phrases included in the data, a similarity of the data to historical data for the material and/or another material (e.g., as determined using machine learning), based on input from a user of client device 210 that identifies a score for the material, and/or the like. Continuing with the previous example, exposure analysis platform 230 may determine a category of materials for the material based on the score satisfying a threshold. Additionally, or alternatively, exposure analysis platform 230 may determine a category of materials for the material based on input from a user of client device 210 that identifies a category of materials for the material.

In some implementations, exposure analysis platform 230 may determine a category of materials for a material using a data model. For example, exposure analysis platform 230 may generate a data model using data for other materials and known categories of materials for the other materials so that exposure analysis platform 230 may determine properties of materials associated with each category of materials. In some implementations, exposure analysis platform 230 may perform a comparison of data associated with a material and a data model to determine a category of materials for the material (e.g., where a result of the comparison indicates a match, where a threshold amount of data matches, etc.).

In this way, exposure analysis platform 230 may process the data to determine a category of materials for the material that indicates a set of exposures related to the material to an organization prior to determining an exposure preparedness level associated with the material.

As further shown in FIG. 4, process 400 may include processing the data to determine an exposure preparedness level associated with the material that indicates a preparedness of the organization to handle the set of exposures related to material (block 430). For example, exposure analysis platform 230 may process the data to determine an exposure preparedness level associated with the material that indicates a preparedness of the organization to handle the set of exposures related to material. In some implementations, exposure analysis platform 230 may process thousands, millions, billions, etc. of data elements, thereby processing a data set that cannot be processed manually or objectively by a human actor.

In some implementations, an exposure preparedness level may be associated with a capability of an organization to handle an exposure associated with a material, to respond to a situation that may occur because of an exposure associated with a material, and/or the like. In some implementations, an exposure preparedness level may be based on material contingencies associated with a material. For example, a material contingency may include an action, a factor, and/or the like related to a material that reduces or eliminates an exposure associated with the material. Continuing with the previous example, a material contingency may include an action, a factor, and/or the like, that permits a threshold availability of a material, despite exposures associated the material.

In some implementations, and for example, a material contingency may relate to whether a material is, or can be, produced internally by an organization or a partner of the organization (e.g., rather than receiving the material from a supplier), whether an alternative supplier of the material has been analyzed and approved (e.g., for quality, for capacity capability, etc.), whether alternative materials are available, whether the organization has a threshold amount of the material in a security stock, whether a security stock is being managed in terms of shelf life of the material or other metrics, and/or the like. Additionally, or alternatively, and as additional examples, a material contingency may relate to whether the organization has a separate security stock for preferred customers, whether a supplier of the material has satisfied regulatory rules related to the material, whether a contract between an organization and a supplier includes price terms related to price fluctuations, whether the material needs to be packaged, handled, shipped, and/or transported in a particular manner (or a manner in which a supplier is packaging, handling, shipping, and/or transporting the material), a result of a FMEA analysis, and/or the like.

Additionally, or alternatively, an exposure preparedness level may be based on supplier mitigations associated with a supplier of a material. For example, a supplier mitigation may include an action, a factor, and/or the like related to a supplier of a material that reduces or eliminates an exposure associated with the material. Continuing with the previous example, a supplier mitigation may include an action, a factor, and/or the like that permits a threshold availability of a material, despite exposures associated with a supplier of the material.

In some implementations, and for example, a supplier mitigation may relate to whether a supplier satisfies particular rules (e.g., related to quality, time, etc.), whether the supplier implements a quality management system, audits, and/or the like, whether the supplier satisfies quality standards, a financial health of the supplier, whether the supplier uses particular metrics to monitor operations of the supplier (and a value of the particular metrics), whether a contract between an organization and a supplier includes terms related to satisfaction of thresholds for metrics, whether a supplier requests a threshold amount of time to change an order for a material, and/or the like. Additionally, or alternatively, and as additional examples, a supplier mitigation may relate to whether an organization is physically inspecting a supplier's premises (and a frequency of such inspections), whether a threshold amount of time from when a supplier profile was last updated has elapsed, whether a supplier profile includes particular information (e.g., the latest annual report for the supplier, the latest financial statements for the supplier, etc.), whether an organization has physically audited security stock held by the supplier, operations continuity and/or recovery plans of the supplier, and/or the like.

In some implementations, exposure analysis platform 230 may determine an exposure preparedness level based on input received from a user of client device 210. For example, exposure analysis platform 230 may receive input from client device 210 that indicates the presence of a material contingency and/or a supplier mitigation.

Additionally, or alternatively, exposure analysis platform 230 may determine an exposure preparedness level based on processing the data using a natural language processing technique, a text analysis technique, a computational linguistics technique, and/or the like to determine an exposure preparedness level. For example, exposure analysis platform 230 may process the data to identify a term and/or phrase that identifies a presence of a material contingency and/or a supplier mitigation.

Additionally, or alternatively, exposure analysis platform 230 may determine an exposure preparedness level using a machine learning technique, an artificial intelligence technique, and/or the like. For example, exposure analysis platform 230 may process data using a machine learning technique, an artificial intelligence technique, and/or the like to identify a presence of a material contingency, a supplier mitigation, and/or the like (e.g., based on a pattern of the data, based on the data being similar to other data that is known to include a material contingency and/or a supplier mitigation, etc.).

In some implementations, exposure analysis platform 230 may generate and/or use a data model to determine an exposure preparedness level. For example, exposure analysis platform 230 may generate and/or use a data model in a manner similar to that described elsewhere herein.

In some implementations, exposure analysis platform 230 may determine a score to determine an exposure preparedness level. For example, exposure analysis platform 230 may determine scores for various supplier mitigations and/or material contingencies identified by processing the data. Continuing with the previous example, exposure analysis platform 230 may determine a first score on a first end of a range of scores for a supplier mitigation and/or material contingency when the supplier mitigation and/or material contingency is not present, and a second score on a second end of the range for the material contingency and/or supplier mitigation when the material contingency and/or supplier mitigation is present.

Continuing still with the previous example, exposure analysis platform 230 may determine various other scores between the first score and the second score depending on a degree to which the supplier mitigation and/or material contingency is present (e.g., whether the supplier mitigation and/or material contingency has been identified by the organization and/or supplier, has been planned for by the organization and/or supplier, is under management by the organization and/or supplier, etc.). Continuing still with the previous example, exposure analysis platform 230 may determine a total score by summing, multiplying, applying a function to, weighting, and/or the like the scores determined for the supplier mitigations and/or material contingencies. In some implementations, the total score may indicate an exposure preparedness level that accounts for material contingencies and supplier mitigations. In this way, exposure analysis platform 230 may determine a score that indicates an exposure preparedness level for a set of exposures associated with a material.

In this way, exposure analysis platform 230 may process the data to determine an exposure preparedness level associated with the material that indicates a preparedness of the organization to handle the set of exposures related to the material to permit and/or cause exposure analysis platform 230 to determine a score that indicates the exposure associated with the material.

As further shown in FIG. 4, process 400 may include determining a prioritization of work for exposure reduction and causing actions to be performed with respect to the exposure reduction (block 440). For example, exposure analysis platform 230 may determine a prioritization of work for exposure reductions and may cause actions to be performed with respect to the exposure reductions. In some implementations, a prioritization of work may identify activities that can reduce exposure for an organization (e.g., by a threshold amount, to a particular level, etc.), areas that can reduce exposure by a threshold amount, and/or the like. In some implementations, exposure analysis platform 230 may identify an action to perform based on information identifying an exposure, information identifying historical actions performed, input from a user, and/or the like. In some implementations, actions that exposure analysis platform 230 identifies may be used to permit an organization to provide a guarantee, an assurance, and/or the like with respect to a material, an exposure, and/or the like.

In some implementations, exposure analysis platform 230 may cause an action to be performed. For example, exposure analysis platform 230 may output information that identifies areas for exposure reduction, output information that identifies actions to be performed to reduce exposure, and/or the like.

In some implementations, exposure analysis platform 230 may determine a score for a material that indicates the exposure related to the material based on the category of materials determined for the material and/or the exposure preparedness level associated with the material. For example, exposure analysis platform 230 may determine a score for the material that indicates the exposure related to the material based on the category of materials determined for the material and/or the exposure preparedness level associated with the material. In some implementations, a score may account for a set of exposures related to the material (e.g., as indicated by a category of materials determined for the material) and actions, factors, and/or the like that reduce or eliminate the set of exposures (e.g., supplier mitigations, material contingencies, etc.). In this way, a score may indicate a total exposure, or a net exposure, associated with a material.

In some implementations, exposure analysis platform 230 may determine a score using a technique. For example, exposure analysis platform 230 may use a machine learning technique, an artificial intelligence technique, and/or the like to determine a score for the material. Continuing with the previous example, exposure analysis platform 230 may use a machine learning technique, an artificial intelligence technique, and/or the like to process data related to the material and other data related to other materials with known exposures (e.g., total exposures or net exposures), to determine whether the data related to the material is similar the other data. In this case, exposure analysis platform 230 may determine a score for the material based on a similarity between the data related to the material and the other data related to the other material. In this way, exposure analysis platform 230 may quickly and efficiently determine a score for a material, thereby conserving processing resources that would otherwise be consumed inefficiently determining a score.

Additionally, or alternatively, and as another example, exposure analysis platform 230 may determine a score based on other scores that exposure analysis platform 230 determined for the material. For example, exposure analysis platform 230 may determine a score for a material that indicates an exposure associated with the material based on a score determined for a category of materials associated with the material, based on a score determined for the material related to an exposure preparedness level, and/or the like. Continuing with the previous example, exposure analysis platform 230 may determine a score by summing the other scores, multiplying the other scores, applying a function to the other scores, weighting the other scores, and/or the like.

In some implementations, and continuing with the previous example, exposure analysis platform 230 may determine a score based on data related to a material (e.g., without regard to other scores related to the material). In this case, exposure analysis platform 230 may use the other scores to adjust the score, thereby improving an accuracy of the score. In some implementations, exposure analysis platform 230 may determine a score for a material using a data model. For example, exposure analysis platform 230 may generate and/or use a data model in a manner similar to that described elsewhere herein.

In some implementations, exposure analysis platform 230 may determine a priority for various materials, actions and/or factors related to an exposure preparedness level, and/or the like based on the score (e.g., a high priority, a medium priority, a low priority, etc.). For example, exposure analysis platform 230 may determine a priority based on the score satisfying a threshold. In some implementations, exposure analysis platform 230 may prioritize materials to identify high exposure, medium exposure, and/or low exposure materials (e.g., a priority may indicate a level of exposure related to the materials), thereby permitting exposure analysis platform 230 and/or an organization to identify materials for which to perform actions to reduce or eliminate an exposure related to the materials.

Additionally, or alternatively, exposure analysis platform 230 may prioritize materials that are associated with a threshold exposure preparedness level, such as to identify materials for which an organization and/or exposure analysis platform 230 may need to perform an action to improve an exposure preparedness level related to the materials (e.g., that are associated with a threshold priority, have a higher priority relative to other materials, etc.). In some implementations, exposure analysis platform 230 may determine a priority to permit and/or cause an action to be performed (e.g., generate a recommendation, generate a report that includes information identifying materials associated with a threshold priority, etc.).

In some implementations, a priority may identify an exposure related to a material. For example, exposure analysis platform 230 may identify materials that are associated with a threshold exposure (e.g., risk), that have the highest exposure relative to other materials, and/or the like (e.g., based on a product that contains the material, a source of the material, a category of the material, etc.). In some implementations, a priority may identify materials for which actions are to be performed (e.g., to reduce or eliminate an exposure). In this way, exposure analysis platform 230 may generate information that identifies, or can be used to determine, priorities for an exposure-related strategy and/or exposure reduction. In addition, in this way, preparedness levels and/or priorities may cause actions to be focused on the highest priority materials, or materials with a threshold priority, thereby improving management of various exposures.

In this way, exposure analysis platform 230 may determine a score for the material that indicates the exposure related to the material based on the category of materials determined for the material and/or the exposure preparedness level associated with the material.

As further shown in FIG. 4, process 400 may include performing an action related to the material based on the score for the material (block 450). For example, exposure analysis platform 230 may perform an action related to the material based on the score for the material (e.g., a score that identifies a total exposure or a net exposure of the material, as described elsewhere herein), such as to reduce or eliminate an exposure associated with the material, to positively impact an exposure associated with the material, and/or the like.

In some implementations, exposure analysis platform 230 may generate a report. For example, exposure analysis platform 230 may generate a report that identifies an exposure associated with a material, scores determined for the material, and/or the like (e.g., a report to be provided to a customer or a manager of an organization). In this way, exposure analysis platform 230 may provide information that can be used to determine whether a guarantee related to a material can be satisfied (e.g., by providing a customer with insight into the information on which the guarantee is based so that a customer or manager can have confidence in an availability of a selected material).

In some implementations, exposure analysis platform 230 may mitigate behavioral exposure (e.g., exposure related to behaviors of individuals related to an organization) via a report that exposure analysis platform 230 generates. For example, a purchasing manager may be willing to provide a customer with a guarantee based on terms of a contract with the customer. Continuing with the previous example, while the purchasing manager may be willing to provide the guarantee, the report may indicate that in order to provide the guarantee, the contract needs to include additional contract terms. This may permit the purchasing manager and/or exposure analysis platform 230 to modify the guarantee, to provide a different guarantee, to identify actions that need to be performed in order to provide the guarantee, and/or the like. In this way, exposure analysis platform 230 may reduce or eliminate behavioral exposure and/or may ensure that actions are focused on particular exposures, thereby improving management of various exposures.

Further, exposure analysis platform 230 may facilitate control and management of exposure reduction activities through generated reports. For example, the reports may permit a manager to confirm that an individual responsible for reducing exposure are doing so in accordance with prompted activities related to reducing exposure (e.g., through human interface or data interface, such as by using data to confirm exposure reduction). In other words, exposure analysis platform 230 may permit a manager to monitor efforts related to reducing exposure of an organization. For example, using various reports that exposure analysis platform 230 generates over time, the manager may be capable of tracking changes to areas of exposure for an organization, such as to determine whether subordinates of the manager are working on reducing exposure that has been prioritized.

Additionally, or alternatively, exposure analysis platform 230 may generate a recommendation. For example, exposure analysis platform 230 may generate a recommendation to implement particular actions, factors, and/or the like (e.g., supplier mitigations, material contingencies, etc.), such as to reduce or eliminate an exposure associated with the material, to cause the material to be associated with a threshold score, and/or the like. Additionally, or alternatively, and as another example, exposure analysis platform 230 may generate a recommendation to use an alternative material (when available), so as to reduce or eliminate an exposure associated with the material.

Additionally, or alternatively, exposure analysis platform 230 may send a message. For example, exposure analysis platform 230 may send a message to client device 210 indicating a score for a material, an exposure associated with a material, and/or the like. Additionally, or alternatively, exposure analysis platform 230 may schedule a meeting. For example, exposure analysis platform 230 may schedule a meeting to discuss a score related to a material, an exposure related to a material, and/or the like using electronic calendars to identify an available time for the meeting and/or generating a calendar item, a meeting invite, and/or the like for the meeting. Additionally, or alternatively, exposure analysis platform 230 may send a message to dispatch an individual or a robot to audit a security stock, to inspect a supplier's facility, and/or the like.

Additionally, or alternatively, exposure analysis platform 230 may generate an order for a material and/or may populate a contract template with information, such as quantity information, price information, and/or the like (e.g., to place an order for a material, such as with another supplier, to order an alternative material, etc.).

Additionally, or alternatively, exposure analysis platform 230 may determine a guarantee related to a material. For example, exposure analysis platform 230 may determine a guarantee based on a score determined for the material, a stock level of the material, security stock level of the material, a demand for the material, an exposure related to the material, and/or the like. In some implementations, when determining a guarantee, exposure analysis platform 230 may use a machine learning technique, an artificial intelligence technique, and/or the like to process data related to the material to determine a guarantee based on a similarity of the data to other data for other materials and/or historical data for the material. Additionally, or alternatively, exposure analysis platform 230 may generate and/or use a data model to determine the guarantee, in a manner similar to that described elsewhere herein.

Additionally, or alternatively, exposure analysis platform 230 may permit a user of client device 210 to perform a search. For example, exposure analysis platform 230 may permit a user of client device 210 to perform a search for materials associated with a threshold level of exposure, a particular product (e.g., to determine an exposure for the product based on materials included in the product), a particular customer (e.g., to determine an exposure for a customer based on products, and the materials the products include), a particular manager (e.g., a manager responsible for managing exposure associated with various materials such as to determine whether the manager is effectively managing exposure), and/or the like. In some implementations, exposure analysis platform 230 may generate a report the includes information identifying a search entered by the user.

Additionally, or alternatively, exposure analysis platform 230 may permit a user of client device 210 to modify a report generated by exposure analysis platform 230. For example, a user of client device 210 may manually update scores, information identifying exposures, information identifying levels of preparedness, and/or the like related to a material.

In some implementations, exposure analysis platform 230 may update data stored by server device 220, client device 210, included in a report, and/or the like. For example, exposure analysis platform 230 may monitor, in real-time or near real-time, data related to a material so as to determine an exposure associated with the material in real-time or near real-time. This improves an accuracy of determining an exposure associated with a material, thereby conserving processing resources that would otherwise be consumed using inaccurate results.

In this way, exposure analysis platform 230 may perform an action related to the material based on the score for the material.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
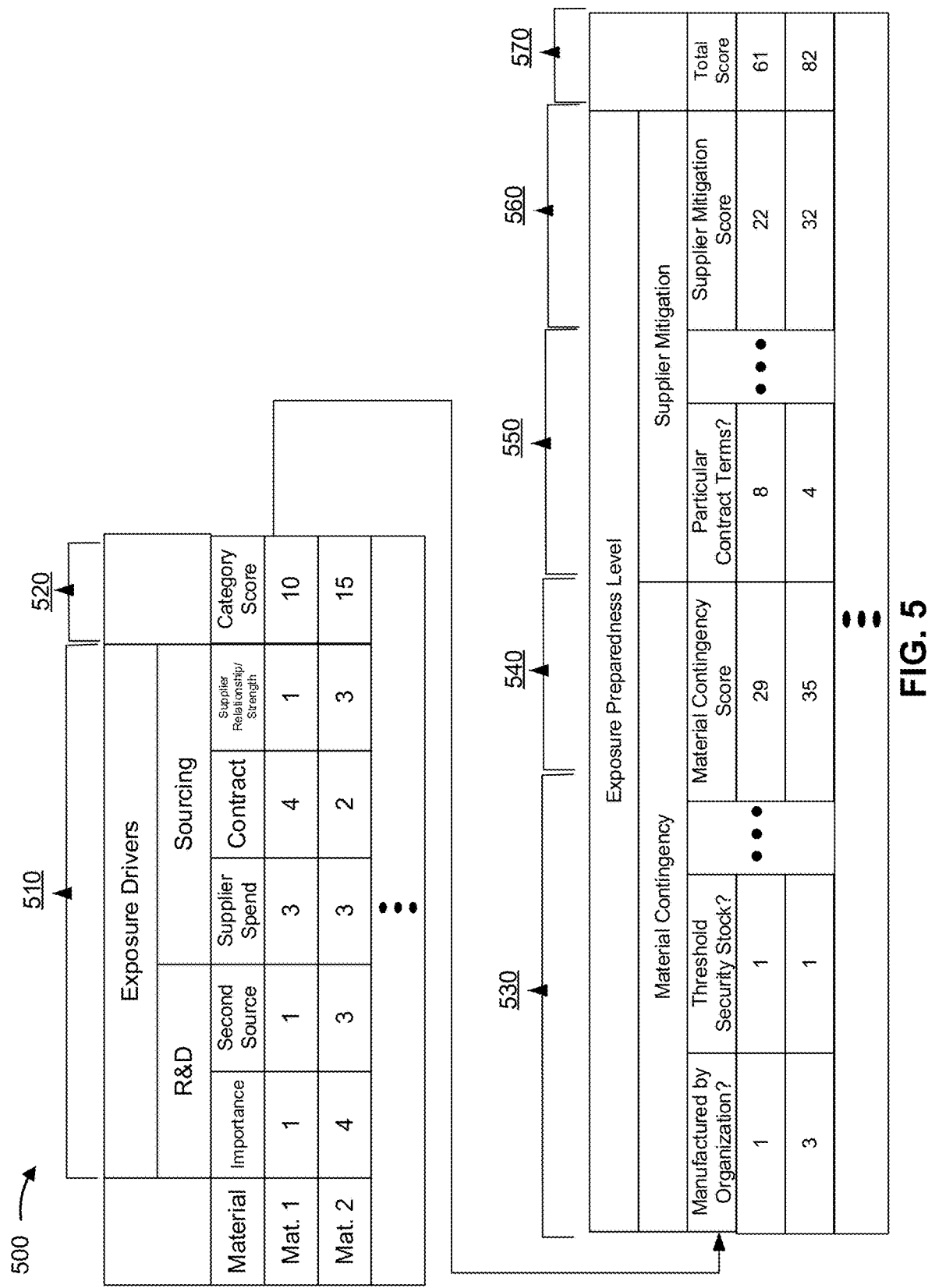
FIG. 5 is a diagram of an example implementation described herein.

FIG. 5 is a diagram of an example implementation 500 relating to example process 400 shown in FIG. 4. FIG. 5 shows an example of the scores that exposure analysis platform 230 may determine for various materials.

In some implementations, and as shown by reference number 510, exposure analysis platform 230 may determine scores for various exposure drivers associated with a material. In some implementations, and as shown by reference number 520, exposure analysis platform 230 may determine a category score based on the scores for the exposure drivers (e.g., by summing scores for the various exposure drivers). In some implementations, the category score may indicate a category of materials associated with the material. In some implementations, and as shown by reference number 530, exposure analysis platform 230 may determine scores for various material contingencies related to the material. In some implementations, and as shown by reference number 540, exposure analysis platform 230 may determine a material contingency score for the various material contingencies (e.g., by summing the scores for the various material contingencies).

In some implementations, and as shown by reference number 550, exposure analysis platform 230 may determine scores for various supplier mitigations associated with a supplier of the material. In some implementations, and as shown by reference number 560, exposure analysis platform 230 may determine a supplier mitigation score for the various supplier mitigations (e.g., by summing the scores for the various supplier mitigations). In some implementations, and as shown by reference number 570, exposure analysis platform 230 may determine a total score for the material. For example, exposure analysis platform 230 may determine a total score that indicates an exposure associated with the material. In some implementations, exposure analysis platform 230 may determine the total score by summing the category score, the material contingency score, and/or the supplier contingency score, and/or as otherwise described elsewhere herein.

Additionally, or alternatively, the total score that exposure analysis platform 230 determines may be based on actions that have been performed to reduce an exposure related to a material (e.g., rather than, or in addition to, summing other scores). For example, particular actions performed to reduce an exposure may increase or decrease a total score by a higher amount relative to other actions (e.g., via weighting of the particular actions). In this way, exposure analysis platform 230 may incentivize actions that have a greater effect on the total score relative to other actions (e.g., actions that are identified as more important relative to other actions, actions that are pre-requisites for particular guarantees, etc.).

As indicated above, FIG. 5 is provided merely as an example. Other examples are possible and may differ from what was described with respect to FIG. 5.

In this way, the exposure analysis platform may automatically analyze information related to materials to permit a reduction or elimination of exposure related to the materials, to permit the organization to more accurately provide a guarantee related to the materials, and/or the like. This conserves processing resources relative to using a set of processing resources that do not efficiently determine exposures, provide minimal exposure information, are not equipped to determine such information, and/or the like (e.g., via faster processing, fewer errors, etc.). In addition, this improves operations of the organization by reducing or eliminating exposures associated with the materials, thereby conserving processing resources that would otherwise be consumed when problems occur due to the exposures. Further, this improves operations of the organization related to managing the exposures via automatic and objective analysis of information related to the exposures.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memories; and
   one or more processors, communicatively coupled to the one or more memories, to:
      receive data related to a material,
         the data permitting an analysis of an exposure related to the material, and
         the data being received from one or more other devices;
      process the data to determine a category of materials for the material,
         the category of materials indicating a set of exposures, related to the material, to an organization;
      process the data to determine an exposure preparedness level associated with the material,
         the exposure preparedness level indicating a preparedness of the organization to handle the set of exposures related to the material;
      determine a first score related to the category of materials;
      determine a second score related to a material contingency related to the material;
      determine a third score related to a supplier mitigation related to a supplier of the material;
      determine a total score for the material based on the first score, the second score, and the third score,
         the total score indicating the exposure related to the material;
      perform an action related to the material based on the total score for the material,
         the action being performed to reduce or eliminate the exposure related to the material; and
      cause the total score for the material to be updated in real-time based on performing the action to improve an accuracy of determining the exposure related to the material.

2. The device of claim 1, where the one or more processors are further to:
   receive information that identifies a product produced by a customer of the organization;
   determine a set of materials included in the product using the information that identifies the product,
      the set of materials including the material; and
   where the one or more processors, when receiving the data, are to:
      receive the data based on determining the set of materials.

3. The device of claim 1, where the one or more processors are further to:
   identify a set of customers associated with the organization;
   identify a set of materials that the organization provides to the set of customers or includes in a set of products provided to the set of customers,
      the set of materials including the material; and
   where the one or more processors, when receiving the data, are to:
      receive the data based on identifying the set of materials.

4. The device of claim 1, where the one or more processors, when processing the data to determine the exposure preparedness level, are to:
   process the data to identify:
      the material contingency related to the material, or
      the supplier mitigation related to the supplier of the material,
         the exposure preparedness level being based on the material contingency or the supplier mitigation.

5. The device of claim 1, where the one or more processors, when performing the action, are to:
   determine a guarantee related to the material.

6. A non-transitory computer-readable medium storing instructions, the instructions comprising:
   one or more instructions that, when executed by one or more processors, cause the one or more processors to:
      receive data related to an item,
         the data permitting an analysis of an exposure related to the item;
      process the data to determine a category of items for the item,
         the category of items indicating a set of exposures, related to the item, to an organization;
      determine a first score related to the item based on the category of items,
         the first score indicating the category of items;

process the data to determine an exposure preparedness level associated with the item,
  the exposure preparedness level indicating a preparedness of the organization to handle the set of exposures related to the item;
determine a second score related to the item based on the exposure preparedness level,
  the second score indicating the exposure preparedness level, and
  the exposure preparedness level being based on:
    a material contingency related to the item, and
    a supplier mitigation related to a supplier of the item;
determine a third score for the item based on the first score and the second score,
  the third score indicating the exposure related to the item;
perform an action related to the item based on the third score for the item,
  the action being performed to reduce or eliminate the exposure related to the item; and
cause the third score for the item to be updated in real-time based on performing the action to improve an accuracy of determining the exposure related to the item.

7. The non-transitory computer-readable medium of claim 6, where the one or more instructions, when executed by the one or more processors, further cause the one or more processors to:
receive information identifying a bill of items for a product that includes the item; and
where the one or more instructions, that cause the one or more processors to receive the data, cause the one or more processors to:
  receive the data after receiving the information identifying the bill of items.

8. The non-transitory computer-readable medium of claim 6, where the one or more instructions, that cause the one or more processors to process the data to determine the exposure preparedness level, cause the one or more processors to:
determine the exposure preparedness level from a set of perspectives related to the item.

9. The non-transitory computer-readable medium of claim 6, where the third score is a net score that accounts for the set of exposures related to the item or the exposure preparedness level associated with the item.

10. The non-transitory computer-readable medium of claim 6, where the one or more instructions, when executed by the one or more processors, further cause the one or more processors to:
determine a priority for the item based on the third score,
  the priority indicating a level of exposure related to the item.

11. The non-transitory computer-readable medium of claim 6, where the one or more instructions, that cause the one or more processors to perform the action, cause the one or more processors to:
generate a recommendation related to the item or the exposure preparedness level to reduce or eliminate the exposure related to the item.

12. A method, comprising:
receiving, by a device, data to permit an analysis of an exposure related to a material,
  the data relating to:
    supplier-related data,
    usage-related data,
    material-related data, and
    regulation-related data;
processing, by the device, the data to determine a category of materials for the material,
  the category of materials indicating a set of exposures, related to the material, to an organization that receives the material from a supplier or provides the material to a customer;
processing, by the device, the data to determine an exposure preparedness level associated with the material,
  the exposure preparedness level indicating a preparedness of the organization to handle the set of exposures related to the material;
determining, by the device, a score that accounts for the set of exposures related to the material or the exposure preparedness level,
  the set of scores being associated with a plurality of exposure drivers associated with the material, and
  the set of scores to be summed to generate a total score;
    the total score indicating the exposure related to the material;
performing, by the device, an action related to the material based on the total score,
  the action being to positively impact the exposure related to the material, and
  the action being performed to reduce or eliminate the exposure related to the material; and
causing, by the device, the total score for the material to be updated in real-time based on performing the action to improve an accuracy of determining the exposure related to the material.

13. The method of claim 12, where receiving the data comprises:
receiving the data based on receiving information identifying a product that includes the material.

14. The method of claim 12, where determining the category of materials comprises:
determining the category of materials based on a score related to the material,
  the score being based on the set of exposures related to the material.

15. The method of claim 12, where determining the exposure preparedness level comprises:
determining the exposure preparedness level based on a score related to the material,
  the score being based on a material contingency related to the material or a supplier mitigation related to the supplier.

16. The method of claim 12, further comprising:
determining whether the total score satisfies a threshold;
determining a priority for the material based on determining whether the total score satisfies the threshold,
  the priority indicating a level of exposure related to the material; and
where performing the action comprises:
  performing the action based on the priority for the material.

17. The method of claim 12, where performing the action comprises:
generating a report that includes information identifying the exposure related to the material; and
providing the report to another device for display.

18. The device of claim 1, where the data includes:
supplier-related data,
usage-related data,
material-related data, and
regulation-related data.

19. The device of claim 1, where one or more processors are further to:
   generate a data model to determine the exposure preparedness level.

20. The device of claim 1, where the one or more processors, when processing the data to determine the category of materials, are to:
   process the data to determine the category of materials based on an importance of the material to at least one of:
      the organization that is to provide the material to a customer, or
      a customer that is to use the material to produce a product.

* * * * *

UNITED STATES PATENT AND TRADEMARK OFFICE
CERTIFICATE OF CORRECTION

PATENT NO. : 10,878,356 B2
APPLICATION NO. : 15/697213
DATED : December 29, 2020
INVENTOR(S) : Heiko Hackel et al.

It is certified that error appears in the above-identified patent and that said Letters Patent is hereby corrected as shown below:

Claim 12:
Column 28, Line 14, change "determining, by the device, a score that accounts for the" to
-- determining, by the device, a set of scores that accounts for the --.

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*